United States Patent [19]

Baier et al.

[11] Patent Number: 4,716,574

[45] Date of Patent: Dec. 29, 1987

[54] WIRELESSLY FUNCTIONING SIGNAL TRANSMISSION SYSTEM

[75] Inventors: Paul W. Baier, Kaiserslautern; Peter Rausch, Pforzheim, both of Fed. Rep. of Germany

[73] Assignee: Siemens Aktiengesellschaft, Berlin and Munich, Fed. Rep. of Germany

[21] Appl. No.: 702,322

[22] Filed: Feb. 15, 1985

[30] Foreign Application Priority Data

Feb. 20, 1984 [DE] Fed. Rep. of Germany ....... 3406083

[51] Int. Cl.$^4$ .............................................. H04L 7/00
[52] U.S. Cl. .......................................... 375/1; 380/34
[58] Field of Search ........... 455/26; 343/5 PN, 6.5 R; 375/417; 342/417; 380/34

[56] References Cited

U.S. PATENT DOCUMENTS

| | | | |
|---|---|---|---|
| 3,427,621 | 2/1969 | Brunner | 343/6.5 R |
| 3,603,990 | 9/1971 | Poirier | 343/5 PN |
| 3,714,573 | 1/1973 | Grossman | 343/5 PN |
| 3,715,750 | 2/1973 | Bishop | 343/6.5 R |
| 3,718,926 | 2/1973 | Parker et al. | 343/6.5 R |
| 4,021,808 | 5/1977 | Spratt | 343/417 |
| 4,156,877 | 5/1979 | Piesinger | 343/5 PN |
| 4,214,209 | 7/1980 | Baier et al. | 375/1 |
| 4,288,866 | 9/1981 | Sackman | 343/5 PN |
| 4,297,704 | 10/1981 | Marom et al. | 343/417 |
| 4,327,438 | 4/1982 | Baier et al. | 375/1 |
| 4,528,567 | 7/1985 | Miles et al. | 343/417 |
| 4,587,662 | 5/1986 | Langewellpott | 343/5 PN |

FOREIGN PATENT DOCUMENTS

| | | | |
|---|---|---|---|
| 1911711 | 10/1969 | Fed. Rep. of Germany | 343/417 |
| 627170 | 10/1961 | Italy | 343/417 |
| 1222518 | 2/1971 | United Kingdom | 343/417 |

OTHER PUBLICATIONS

Peter Honold, "Secondary Radar", 1976, Siemens AG, Berlin and Munich, Hevden & Son Ltd., London, pp. 46–52.

Primary Examiner—Salvatore Cangialosi
Attorney, Agent, or Firm—Hill, Van Santen, Steadman & Simpson

[57] ABSTRACT

In a signal transmission system for broadband signals wherein the transmitting transducer and/or the receiving transducer has a non-isotropic radiation characteristic, properties of the received broadband signal, for example waveform shape, spectrum, duration and probability density function, depend on the alignment orientation of the transducers. A discriminator circuit is provided in the receiver for identifying or estimating parameters related to one or more of such properties as a measure of alignment orientation of the transducers. The invention can be utilized, for example, in noise-suppressing radio frequency message transmission systems wherein band spreading modulation (spread-spectrum-system) results in transmission of a much greater bandwidth than a conventional transmission of the message baseband frequencies.

21 Claims, 13 Drawing Figures

WIRELESSLY FUNCTIONING SIGNAL TRANSMISSION SYSTEM

BACKGROUND OF THE INVENTION

The invention relates to a system and method utilizing radiated energy for the transmission of signals having a broad frequency spectrum, wherein either the transmitting transducer or the receiving transducer, or both transducers have a non-isotropic (i.e. directional) radiation pattern, so that certain properties of the received broadband signal depend on the directional alignment of the transducers. In this specification signals having a broad frequency spectrum means, for example, signals having the shape of rectangular pulse waves, spike pulses, or trapezoidal pulses as contrasted to single frequency sine waves, systems for radiating broadband signals per se are well known in the art.

In certain signal transmission systems of the foregoing type, there is an interest in identifying at the receiver whether the received signal is attributable to the main lobe or to a side lobe in the directional pattern of the transducer or transducers, such identification to be independent of the received power and, thus, of the distance between the transmitter and the receiver. In the case of a radio frequency signal transmission system having, for example, a directional antenna disposed at the transmitting location and a receiving antenna having an omnidirectional characteristic, it would thus be desirable to determine whether the received signal was attributable to the transmission signal beamed out via the main lobe or via a side lobe of the transmitting antenna.

Up to now, this problem has been resolved by a procedure wherein, using constant transmitter power, a reference signal is transmitted at a certain time via a transducer having an omnidirectional characteristic, and is compared at the receiver with a signal beamed out at a different time via a transducer having a directional characteristic. When the power of the received reference signal is relatively low in comparison to that for the received directional signal, then the main lobe of the directional transducer is aligned with the receiving transducer. When the power of the received reference signal is relatively high, then the side lobe of the transmitting transducer is directed so that the energy thereof is bypassing the receiving antenna. The book *Sekundär-Radar* by P. Honold, Siemens AG, 1971, pages 48–54 is referenced in this context. (In the English language version *Secondary Radar,* 1976, the corresponding discussion is found at pages 46–52.)

SUMMARY OF THE INVENTION

The object of the invention is to acquire information about the respective alignment of the directional transducer or, respectively, of the directional transducers relative to one another, for the case of broadband transmission signals without an involved comparison of received powers based on switching between reference signal and directional signal transmission or the like. Thus, for example, the invention should enable discrimination between main and side lobe reception at the receiver in instances in which a broadband radio frequency transmission signal is beamed out with a single directional antenna configuration.

In accord with the invention, which relates to a signal transmission system of the type initially cited, this object is achieved in that the received signals are supplied to a discriminator circuit in the receiver in which one or more alignment-dependent parameters of the received signals such as, for example, the shape of a correlation waveform, the spectrum, the duration, and/or a probability density function (but excluding received signal amplitude and power), are identified or estimated to provide directional information with respect to the directional transducer or, respectively, directional transducers. The invention is thus based on the perception that, for the case of transmission of a broadband signal, the properties of the received signal depend on the angular position of the directional transducer or, respectively, of the directional transducers relative to one another.

The discriminator circuit in the receiver advantageously contains a means in which an identification is made as to whether and/or how one or more properties of the received signals deviate from the corresponding properties of the transmitted signals.

The signal transmission system of the invention can be a radio frequency transmission system whose transducers are then antennas, or an acoustic system whose transducers are formed by loudspeakers and microphones or the like. Alternatively, the transmission system can utilize electromagnetic radiation outside the radio frequency spectrum, e.g. an optical transmission system.

In any case, messages can be transmitted by means of the system of the invention. What is particularly advantageous is the design of the signal transmission system of the invention as a so-called interference-suppressing communications transmission system wherein the base band signal is subjected to a band-spreading modulation so that the useful spectrum greatly exceeds that of a conventional, narrow-band system for transmitting message modulation. This band-spreading modulation can be a pseudo-random phase-shift modulation (PN-PSK) or a pseudo-random minimum shift keying modulation (PN-MSK).

The distance between transmitter and receiver locations can be determined by obtaining a measure of signal transit time. For example, a transmission time coded in the transmitted signal can be processed at the receiver by means of an auxiliary means which is additional to the conventional receiver components. With the use of another auxiliary means in the receiver, the transmitted signal can be compared to a signal transmitted from a different location, so that the distance between one transmission location and the reception location can be identified by means of identifying the transit time differential of the signals. By the use of another auxiliary means in the receiver, the phase position of the received signal and, thus, the distance between transmitting and receiving location can be identified. A further auxiliary means in the receiver may compare the phase position of the signal received from another transmitting location so as to enable an identification of the distance between one transmitting location and the receiving location by identifying the phase difference. The relative speed between the transmitter and the receiver can be determined from the Doppler shift in another auxiliary means in the receiver.

Particularly advantageous in the invention is the fact that a message transmission and an acquisition of directional and/or location information are simultaneously possible based on the same transmitting configuration (without antenna switching or the like).

An expedient improvement of the invention resides in that measures, for example a post-integration, can be undertaken by means of an auxiliary means in the receiver for reducing the error probabilities in the directional identification and/or range identification and/or velocity identification.

By means of an additional auxiliary means in the receiver, the reception on a side lobe can be suppressed so that a receiver or, respectively, transmitter situated in a specific direction, or in a specific direction and at a specified range, can be exclusively selected by means of a dialing-up procedure.

The invention shall be explained below with reference to figures on the accompanying drawing sheets; and other objects, features and advantages will be apparent from this detailed disclosure and from the appended claims.

BRIEF DESCRIPTION OF THE DRAWING

FIG. 2 also diagrammatically indicates a first receiver located in the direction of maximum radiation and a second receiver aligned with a side lobe of the transmitter radiation pattern;

DETAILED DESCRIPTION

Figure 1:
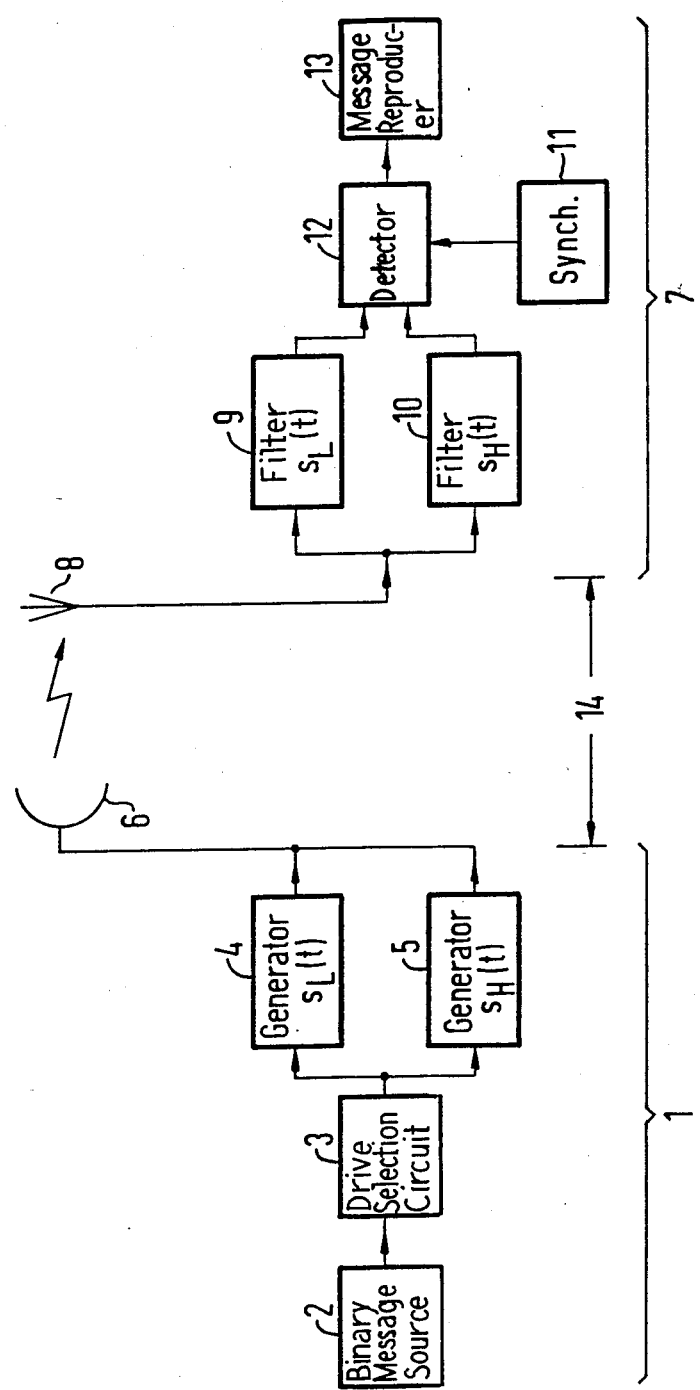
FIG. 1 shows the circuit structure of a communications transmission system (spread spectrum system) for the transmission of binary messages which functions with band spreading modulation.

FIG. 1 shows the circuit-technical structure of a known transmission system for the transmission of binary messages which functions with additional band-spreading modulation, i.e. spread spectrum transmission (so-called Spread-Spectrum-System).

In a broadband transmitter such as indicated at 1 in FIG. 1, a binary message sequence (spread-spectrum-signal) from a binary message source 2 is supplied to a drive selection circuit 3 which responds to each successive binary digit of the binary message to activate one of the spread spectrum signal sources 4 and 5. For example, if the binary digits are represented by logical L and logical H signals, the selection circuit 3 may respond to each logical L signal of the binary message to activate generator 4, and may respond to each logical H signal to activate generator 5. The generators 4 and 5 may supply to transmitting transducer 6 respective distinctive spread spectrum transmission signal segments each having a given time duration and having respective waveforms as a function of time spread spectrum-signals designated $s_L(t)$ and $s_H(t)$. In the illustrated embodiment, the sequence of transmission signal segments in accordance with the binary message may be radiated via a directional antenna 6. A broadband receiver is indicated at 7 and is situated in the field of the transmitting antenna 6. By way of example, where the transmitting antenna 6 is directional, the receiving antenna 8 may have an omnidirectional characteristic. The received broadband signal from antenna 8 is supplied to the inputs of respective filters or correlation circuits 9 and 10. The filter 9 may be watched to transmit an output in response to received signal segments produced by the transmitted waveform $s_L(t)$, while filter 10 may respond to received signal segments produced by the transmitted waveform $s_H(t)$. By way of example, filters 9 and 10 may compare each received signal segment with a representation of the respective waveforms $s_L(t)$ and $s_H(t)$ such that a correlation pulse is generated at the output of the respective filter matched to the received signal segment. The outputs of the filters are supplied to respective inputs of a detector 12 which is controlled by a synchronizing means 11. The output of the detector 12 is connected to a message reproducer means 13 which reproduces the transmitted binary message signal. By way of example, detector 12 may supply a logical L signal to reproducer 13 each time filter 9 supplies a correlation pulse, and may supply a logical H signal each time filter 10 supplies a correlation pulse.

By way of specific example, it is assumed in the following that the signal waveforms $s_L(t)$ and $s_H(t)$ are generated by respective pseudo-random phase shift modulations of a carrier wave between a phase of zero degrees and a phase of one hundred and eighty degrees, based on the successive states of respective different pseudo-random functions $$p_L(t) \in \{-1, 1\}$$

and $$p_H(t) \in \{-1, 1\},$$

where $p_L(t)$ and $p_H(t)$ each have a "chip duration" or clock interval $T_c$ and a "chip number" or number of clock intervals L, (such that the pseudo-random sequences each have a duration equal to the product of L and $T_c$). The spread-spectrum signals can then be represented in the form $$s_L(t) = A \text{ rect } (t/T) p_L(t) \cos (2\pi f_0 t + \phi_L) \tag{1}$$

and $$s_H(t) = A \text{ rect } (t/T) p_H(t) \cos (2\pi f_0 t + \phi_H) \tag{2}$$

(Definitions of the symbols used in the present specification are listed in TABLE I following the discussion of equation (16).)

Figure 2:
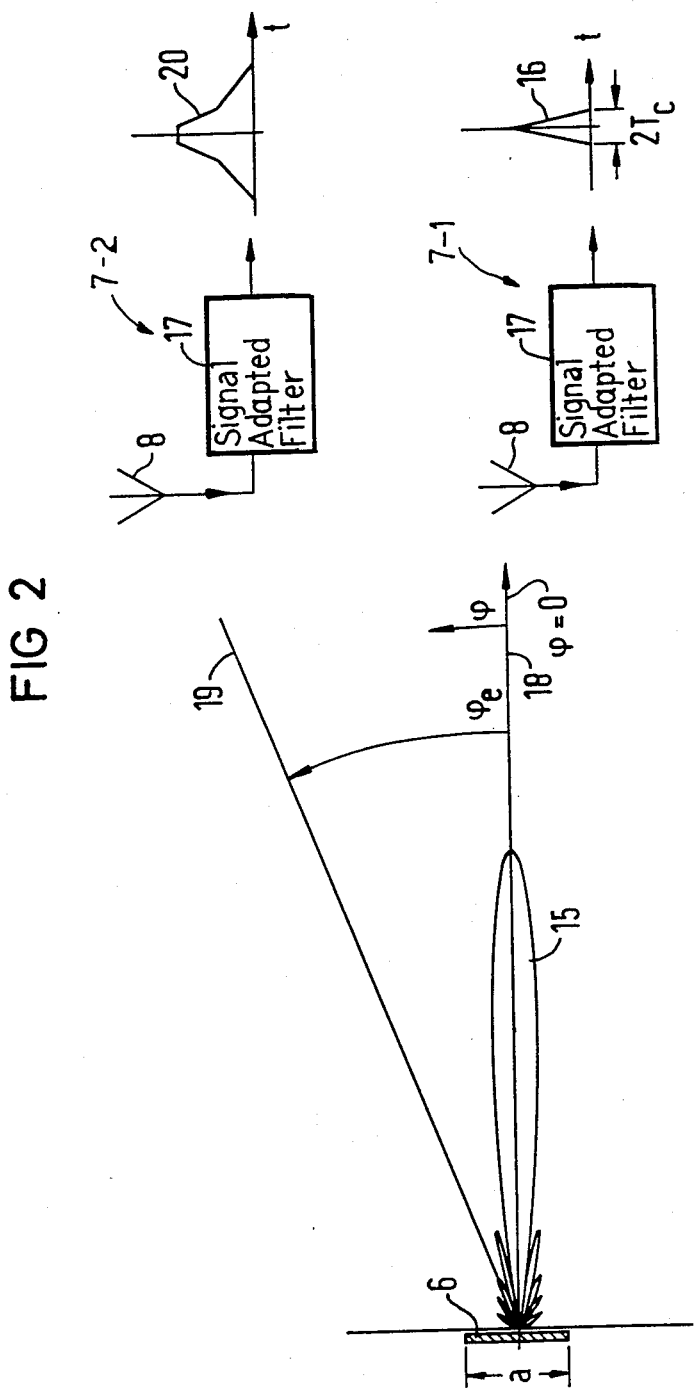
FIG. 2 a diagrammatic plan view showing a planar type radiator functioning as a transmission antenna and having an illustrated horizontal directional characteristic with respect to the horizontal plane.

In FIG. 2, a transmitting antenna 6 is shown by way of example as a homogeneously planar type directional radiator having the width a. Leaving parasitic effects out of consideration, the desired correlation pulses for the case of reception via the main lobe 15 of the transmitting antenna have a triangular envelope 16 with the base width $2T_c$.

Referred to below as transmission channel is the path 14, FIG. 1, from the input of the transmitting antenna 6 up to the output of the receiving antenna 8. In a model of this transmission channel, a spherical coordinate system having the coordinates r, $\phi$, $\theta$ is employed for the transmitting antenna. It turns out that the transfer function of the transmission channel 14 is dependent on the angular direction (or alignment direction) of the receiving antenna relative to the direction of maximum radiation of transmitting antenna 6 (which is assumed to be in direction $\theta=90°$, $\phi=0°$). When the considerations are restricted to the horizontal plane ($\theta=90°$), then the transfer function depends on the horizontal angle $\phi_e$ that the direction of the receiving antenna 8 forms relative to the direction of maximum radiation ($\phi=0$) of the transmitting antenna 6. The transfer function is a function of the frequency f and of the angle $\phi_e$ and is therefore referred to below as G (f,$\phi_e$). The dependency of the transfer function on $\phi_e$ is nonlinear such that the transfer functions for different directions $\phi_e$ cannot be converted into one another by means of multiplication with a constant factor.

As an example, FIG. 2 shows the horizontal antenna pattern of a suitable planar type radiator employed as transmitting antenna 6 and, in a simplified fashion, indicates a first receiver at 7-1 reduced to a single matched filter 17, said receiver at 7-1 being situated in a direction of main radiation ($\phi_e=0$) which is represented by directional line 18, and indicates a second identical receiver at 7-2 located in a direction of secondary radiation ($\phi_e>0$) of the transmitting antenna 6 which is represented by directional line 19. Typical envelope curves 16 and 20 of the correlation functions are also shown at the right in FIG. 2, the curve 16 applying to main lobe reception and the curve 20 applying to side lobe reception. The scale of the antenna pattern has been elongated by a factor of ten in the ordinate direction (parallel to the width dimension a) so that the side lobes can be more clearly recognized in FIG. 2.

As a result of the symmetry properties of the antenna pattern of the transmitting antenna 6, it suffices to investigate the properties of G (f,$\phi_e$) for the angular range $0 \leq \phi_e \leq 90°$. The results are briefly summarized below. When the receiver is in the direction of main radiation ($\phi_e=0$), then $$G(f,0) = 1 \quad (3)$$

may be set for the transfer function. When the receiver is outside of the direction of main radiation, ($\phi_e>0$), then $$\underline{G}(f, \phi_e) = \frac{\sin\left[\frac{\pi a}{\lambda_o} \frac{f}{f_o} \sin\phi_e\right]}{\frac{\pi a}{\lambda_o} \frac{f}{f_o} \sin\phi_e} \quad (4)$$

applies with $f_o$ being the center frequency of the transmission system.

The observations that follow shall be restricted to angles $\phi_e>0$ at which the transfer function G (f,$\phi_e$) reaches maxima as a function of $\phi_e$ under the pre-condition $f=f_o$. These directions $\phi_e$ are the directions $\phi=\phi_n$ of the minor maxima of the antenna characteristic at the center frequency $f_o$. With respect to the order n of the minor maximum, $$\underline{G}(f,\phi_e) = \underline{G}(f,\phi_e = \phi_n) = \frac{\sin\left[\pi \frac{f}{f_o}(n + \frac{1}{2})\right]}{\pi \frac{f}{f_o}(n + \frac{1}{2})} \quad (5)$$

is obtained for $\phi_e=\phi_n$ (n=1, 2, ...).

Figure 3:
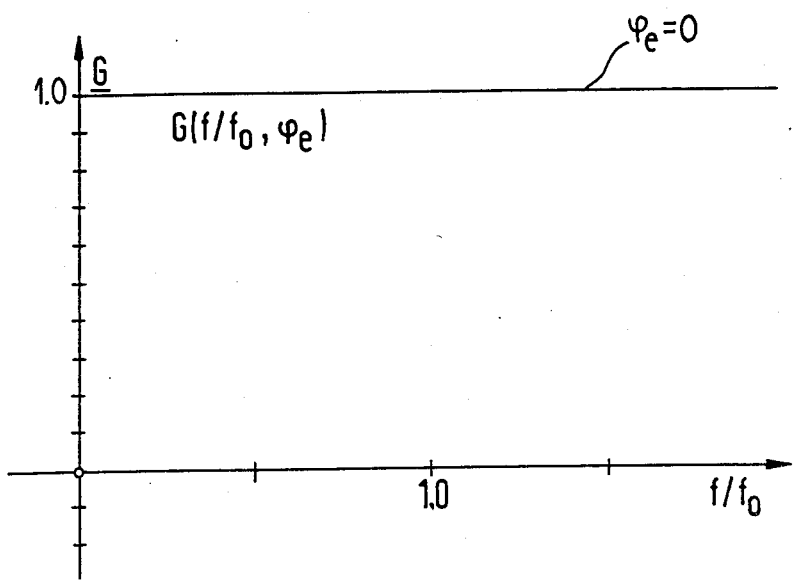
FIGS. 3 and 4 show transfer functions as seen by the receiver, for those cases in which the receiver is in a main maximum (FIG. 3) and in a side maximum (FIG. 4)
Figure 4:
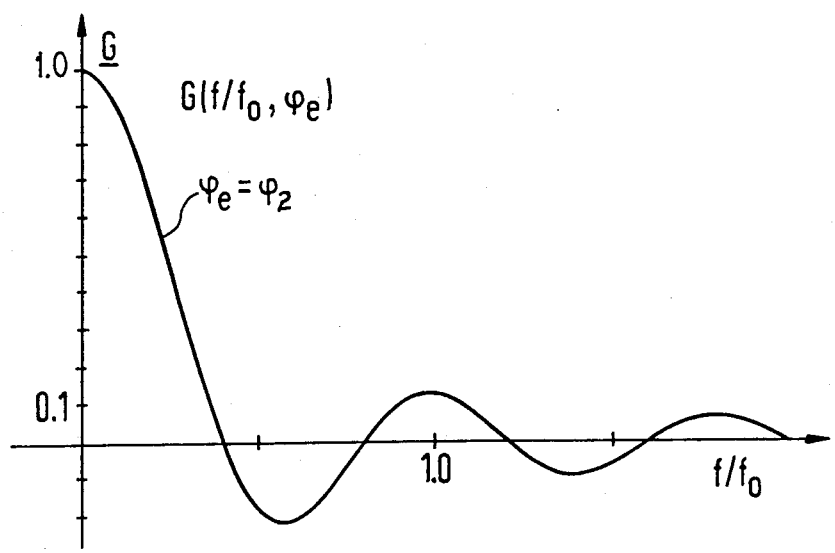

FIG. 3 shows the transfer function G(f,0) according to equation (3) above. The transfer function G(f,$\phi_e=\phi_2$) is shown by way of example in FIG. 4 for the case in which the receiver is in the minor maximum n=2. When FIGS. 3 and 4 are compared, then one can see the dependency of the transfer function G(f,$\phi_e$) on the angle $\phi_e$ which defines the direction of receiving antenna 8 relative to the direction of main radiation ($\phi=0$) of the transmitting antenna 6.

The effect of the angular dependency of the transfer function G(f,$\phi_e$) of the transmission channel 14 on the correlation function of the transmitted PN-PSK signal as obtained at the receiver shall be discussed below.

First, let it be assumed that the undisturbed case exists. When the receiver with its antenna 8 is at 7-1, FIG. 2, corresponding to the main maximum of the transfer function, then the correlation function appearing at the output of the matched filter 17 has the triangular envelope 16 that is to be expected. When, however, there is reception in a direction corresponding to a minor maximum of the transfer function, i.e. when $\phi_e=\phi_n$, n=1, 2 ..., then this envelope, for example the envelope 20, FIG. 2, deviates all the more greatly from the triangular shape the higher the order n of the minor maximum. This effect is all the more pronounced the greater the bandwidth of the transmitted spread-spectrum signal. It is employed in accord with the invention in order to discriminate between main and side lobe reception.

Figure 5:
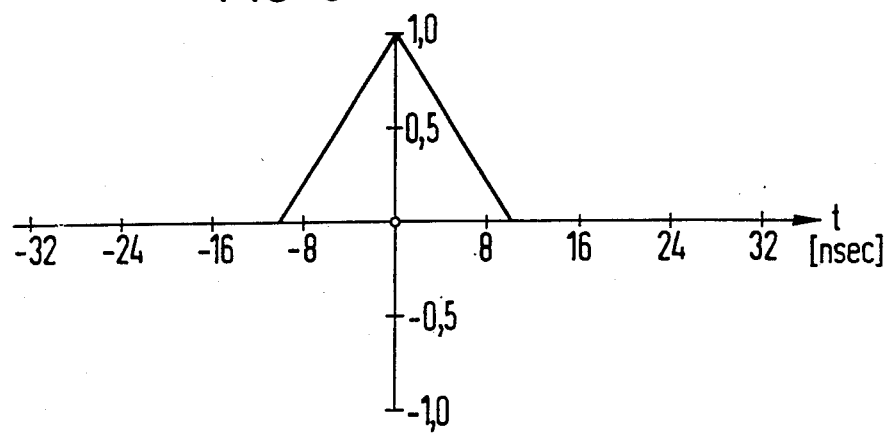
FIGS. 5 and 6 show standardized envelopes of the correlation function as a function of time for the case of reception in the direction of the main maximum (FIG. 5) and for the case of reception in the direction of a side maximum (FIG. 6)
Figure 6:
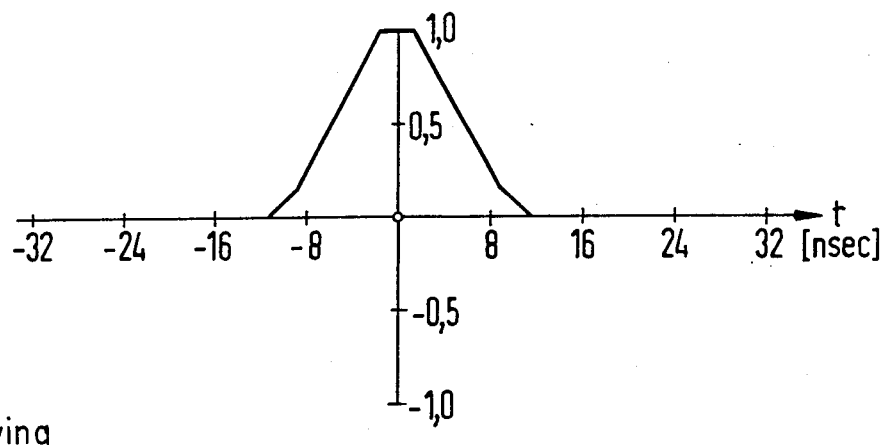

FIGS. 5 and 6 show the envelope of the correlation function as a function of time t for the example $T_c=10$ ns and $f_o=1$ GHz. FIG. 5 applies for reception at the main maximum ($\phi_e=0$); FIG. 6 applies for reception at the side maximum n=2. FIG. 6 clearly shows the deviation of the correlation function from the triangular shape.

As FIGS. 5 and 6 show, the envelope of the correlation function for the case of side lobe reception is flattened and broadened in comparison to the envelope for the case of main lobe reception. A discrimination can be made between side lobe reception and main lobe reception on the basis of this effect.

Figure 7:
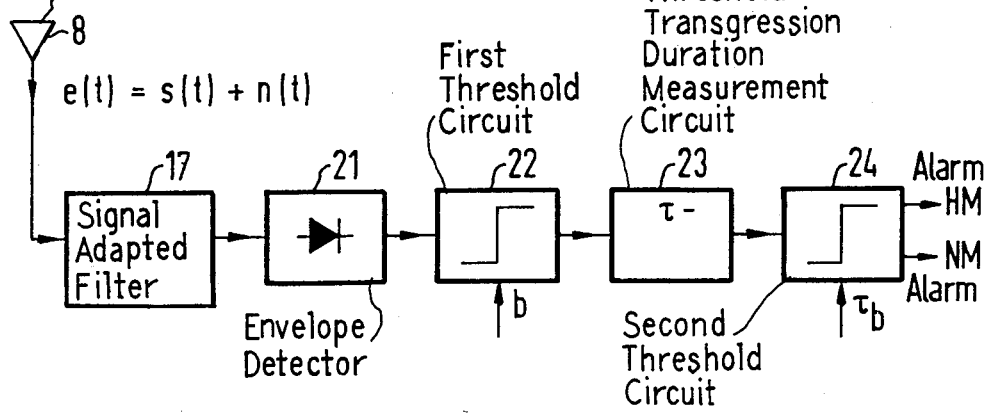
FIG. 7 shows the fundamental circuit diagram of a suitable discriminator means according to the invention for evaluating whether side lobe or main lobe reception is occurring.

FIG. 7 shows the fundamental circuit diagram for a main lobe-side lobe discrimination means in the receiver. The reception signal e(t) is composed of a desired signal s(t) and of a noise or jamming signal n(t), i.e.

$$e(t) = s(t) + n(t) \quad (6)$$

The envelope of the correlation function is acquired by means of a matched filter 17 connected with the receiving transducer 8, which may be an omnidirectional antenna as in FIGS. 1 and 2. In FIG. 7, an envelope detector has been separately indicated at 21. The correlation pulse waveform as a function of time such as indicated in FIG. 5 or FIG. 6 is supplied to a threshold detector 22, FIG. 7, which has a selectable threshold value b. The value b represents a detection threshold, and portions of the output of envelope detector 21 which exceed the threshold value produce a rectangular waveform logic output which is transmitted to a circuit 23 for obtaining a measure of the duration $\tau$ of the peak portion of the correlation waveform as transmitted by the threshold circuit 22. The output of the duration measurement circuit 23 is supplied to second threshold detector 24 having a selectable threshold value $\tau_b$. This second threshold detector 24 has the threshold value $\tau_b$ selected so as to discriminate between alignment directions such as indicated at 18 and 19 in FIG. 2, that is so that it can be determined at the receiver, whether reception is taking place at the main maximum ($\phi_e=0$) or at a minor maximum ($\phi_e=\phi_1$, $\phi_e=\phi_2$, ... or $\phi_e=\phi_n$). In FIG. 7, the second threshold detector 24 is shown as having two outputs, output HM signalling the presence of a value of $\tau$ less than $\tau_b$, and output NM signalling that the $\tau$ value supplied by circuit 23 equals or exceeds the threshold value $\tau_b$. When a suitable threshold value $\tau_b$ has been selected, a decision can be made as to whether there is reception in the main maximum or in a side maximum, making use of the following hypotheses:

reception in the main maximum exists (=alarm HM) when the level crossing-duration $\tau$ is less than $\tau_b$ (hypotheses $H_H$)

$$H_H : \tau < \tau_b \qquad (7)$$

reception in a minor maximum (alarm NM) exists when the duration $\tau$ is greater than or equal to $\tau_b$ (hypothesis $H_N$)

$$H_N : \tau \geq \tau_b \qquad (8)$$

As a consequence of the received noise or jamming signal n(t), the level-crossing duration $\tau$ is a stochastic process. The probability density function $p_\tau(\tau)$ for the level-crossing duration $\tau$ can be calculated with the use of statistical signal theory. White Gaussian noise free of mean value having the variance $\sigma^2$ is assumed as the noise signal. Since the noise signal is a Gaussian process the level-crossing duration $\tau$ is likewise a Gaussian process under the condition $\gamma \gg 1$. Consequently, $p_\tau(\tau)$ is a Gaussian probability density function.

With the "chip duration" (or binary clock interval) $T_c$, the center transmission frequency $f_o$ and the signal-to-noise ratio $\gamma$ in dB, the following equation (9) is obtained for the probability density function $p_{\tau H}(\tau)$ as a function of the duration $\tau$ of the signal transmitted by the first threshold detector 22, FIG. 7, where the receiver is located as indicated at 7-1 in FIG. 2, for reception at the main maximum; and the following equation (11) is obtained for the probability density function $p_{\tau N}(\tau)$ as a function of the duration $\tau$ of the signal transmitted by the first threshold detector 22, FIG. 7, where the receiver is located for reception in a minor maximum of the order n, equation (10) showing the expression for $x_1$ as found in equation (11):

$$P_\tau(\tau) = P_{\tau H}(\tau) = \frac{10^{0.05\gamma}}{T_c \sqrt{\pi} \{1 + erf[10^{0.05\gamma}(1-b)]\}} \exp\left\{ \frac{-10^{0.1\gamma}[\tau - 2T_c(1-b)]^2}{4T_c^2} \right\} \qquad (9)$$

$$x_1 = 10^{0.05\gamma}\left[\frac{4f_oT_c - b(4f_oT_c - 2n - 1)}{4f_oT_c - 2n - 1}\right] \qquad (10)$$

$$P_\tau(\tau) = P_{\tau N}(\tau) = \frac{4f_o \cdot 10^{0.05\gamma}}{\sqrt{\pi}(4f_oT_c - 2n - 1)[1 + erf(x_1)]} \exp\left\{ -4f_o^2 \cdot 10^{0.1\gamma} \frac{\left(\tau - \frac{1}{2f_o}[4f_oT_c - b(4f_oT_c - 2n - 1)]\right)^2}{(4f_oT_c - 2n - 1)^2} \right\} \qquad (11)$$

Figure 8:
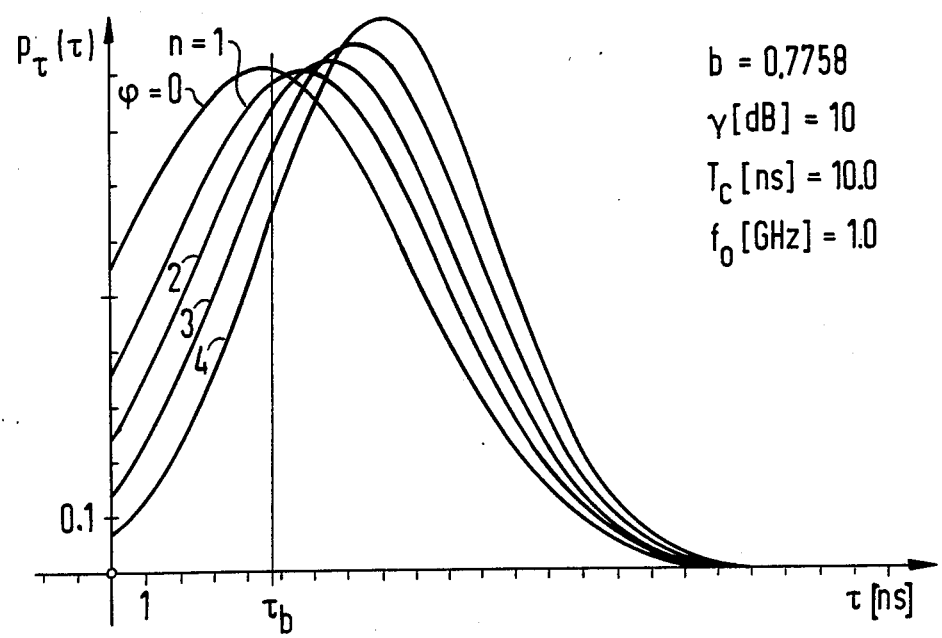
FIGS. 8 and 9 show examples of standardized probability density functions applying respectively to reception in the main maximum and in various side maxima and for respective different signal to noise ratios.
Figure 9:
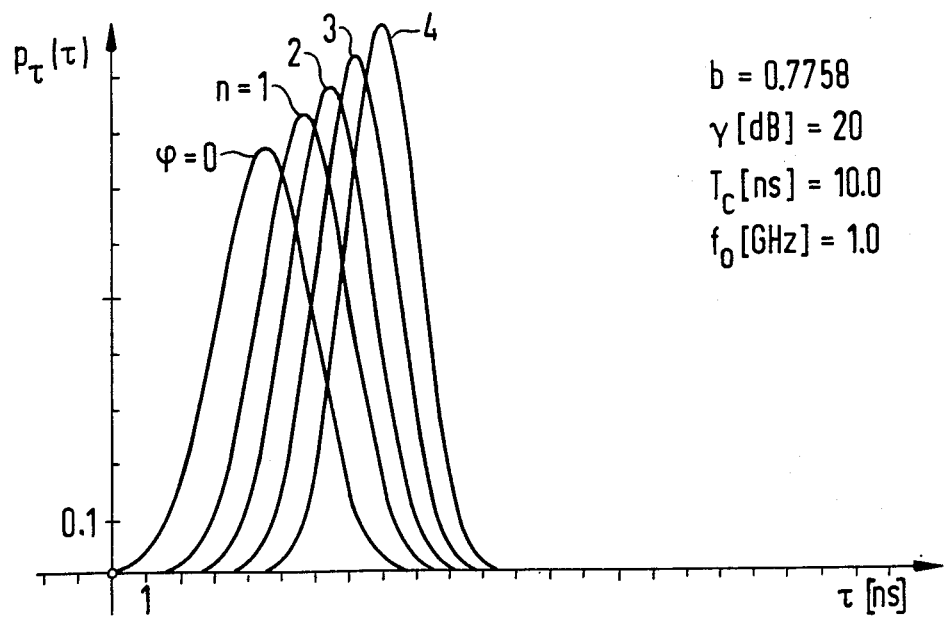

By way of example, FIGS. 8 and 9 show the standardized probability density functions $p_\tau(\tau)$ according to equations (9) and (11) for reception in the main maximum and in the side maxima of the order n=1 through n=4 as a function of $\tau$. The relevant parameters are indicated in FIGS. 8 and 9, from which it will be seen that FIG. 8 applies for a signal-to-noise ratio $\gamma$ of ten decibels, while FIG. 9 shows the probability density functions for the case where $\gamma$ is equal to twenty decibels. In each case the value b for the first threshold detector 22 is 0.7758, the value of $T_c$ is 10.0 nanoseconds, and the value of the center carrier frequency $f_o$ is 1.0 gigahertz.

Given a prescribed magnitude $\tau_b$ of the discrimination threshold (FIG. 8), the detection probabilities for reception in the main maximum or, respectively, in the side maxima can be calculated by means of integration based on the probability density function given by equation (9) or equation (11), respectively. The probability that a decision will be made in the circuit of FIG. 7, based on hypothesis $H_H$ and in favor of reception in the main maximum, when there is reception in the main maximum as indicated at 7-1 in FIG. 2, is represented by $P_{do}$ and is shown by the following equation (12); the probability that a decision will be made in the circuit of FIG. 7, based on hypothesis $H_N$ and in favor of reception in a side maximum of the order n, when there is reception in a side maximum of the order n, is designated $P_{dn}$ and is shown by the following equation (13), where $x_1$ is in accordance with equation (10):

$$P_{do} = P(\tau/H_H) = \int_0^{\tau_b} P_{\tau H}(\tau)d\tau = \qquad (12)$$

$$\frac{erf\{10^{0.05\gamma}(1-b)\} + erf\left\{\frac{10^{0.05\gamma}}{2T_c}[\tau_b - 2T_c(1-b)]\right\}}{1 + erf\{10^{0.05\gamma}(1-b)\}}$$

$$P_{dn} = P(\tau/H_N) = \int_{\tau_b}^\infty P_{\tau N}(\tau)d\tau = \qquad (13)$$

-continued $$1 - \text{erf}\left\{ 2f_o 10^{0.05\gamma} \frac{\tau_b - \frac{1}{2f_o}[4f_oT_c - b(4f_oT_c - 2n - 1)]}{4f_oT_c - 2n - 1} \right\}$$
$$\overline{1 + \text{erf}(x_1)}$$

The error probability that a decision for reception in a side maximum will be made even though there is reception in the main maximum in referenced $Q_o$. With $P_{do}$ according to (12), it is $$Q_o = 1 - P_{do}. \quad (14)$$

The error probability that a decision for reception in the main maximum will be made even though there is reception in a side maximum of the order n is referenced $Q_n$. With $P_{dn}$ according to (13), $$Q_n = 1 - P_{dn}. \quad (15)$$

Figure 10:
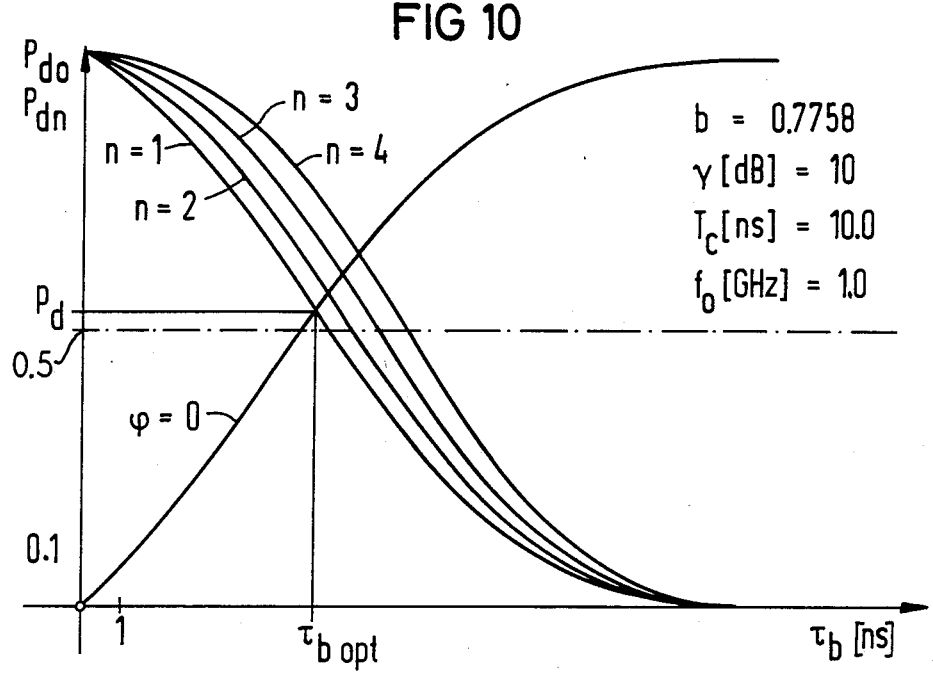
FIGS. 10 and 11 illustrate respective detection probabilities for reception in the main maximum and in four side maxima, as a function of the height of the discrimination threshold, based on the probability density functions of FIGS. 8 and 9.
Figure 11:
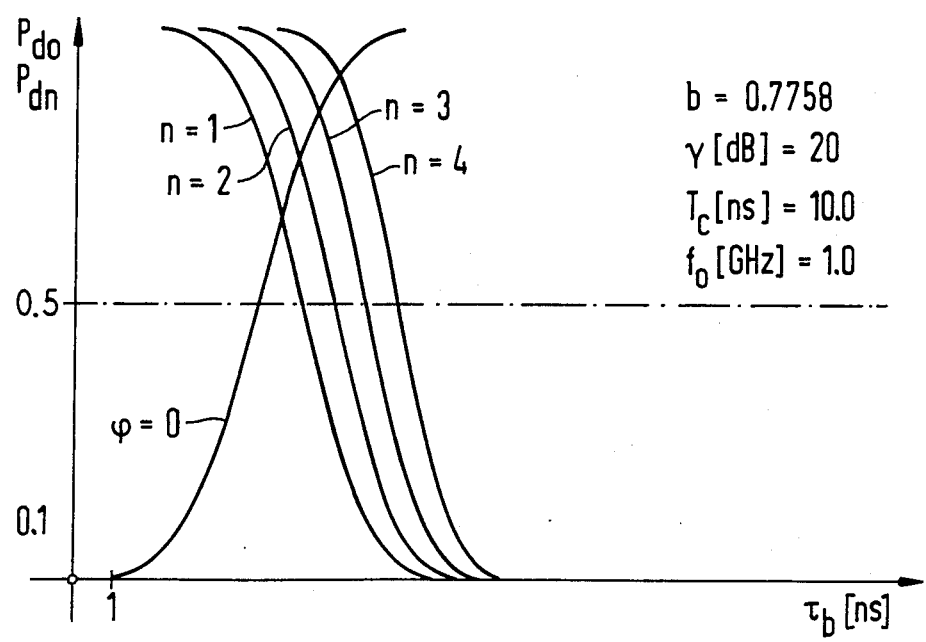

Since the error probabilities $Q_o$ and $Q_n$, respectively, can be derived from the detection probabilities $P_{do}$ and $P_{dn}$, respectively, by means of difference formation according to equations (14) and (15), respectively, the numerical evaluation of the expressions (12) and (13) is sufficient. By way of example, FIGS. 10 and 11 show curves for the detection probability $P_{do}$ according to equation (12) for the case of reception in the main maximum ($\phi=0$) and curves for the detection probabilities $P_{dn}$ according to equation (13) for the case of reception in the side maxima of the order n=1 through n=4, respectively, as a function of the value, $\tau_b$ of the discrimination threshold. The parameters respectively employed are indicated in FIGS. 10 and 11, and correspond with those for FIGS. 8 and 9, respectively.

The intersection of $P_{do}(\tau_b)$ and $P_{dl}(\tau_b)$, (n=1), is of particular interest. The abscissa value corresponding to this intersection is referenced $\tau_{bopt}$ (FIG. 10). When there is reception in the main maximum, then a decision for reception in the main maximum will be made with the probability $P_{do}(\tau_{bopt})$. When there is reception in the side maximum n=1, then a decision for reception in the first side maximum will be made with the probability $P_{dl}(\tau_{bopt})$. Valid, however, at the aforementioned intersection is, (see FIG. 10), $$P_{do}(\tau_{bopt}) = P_{dl}(\tau_{bopt}) = P_d \quad (16)$$

so that both events will be recognized with the same probability depending upon whether the hypothesis $H_H$ or, respectively, $H_N$ according to (7) or, respectively, (8) is satisfied.

The analogous respectively applies to the intersection of $P_{do}(\tau_b)$ and $P_{dn}(\tau_b)$, n>1 in FIGS. 10 and 11.

Figure 12:
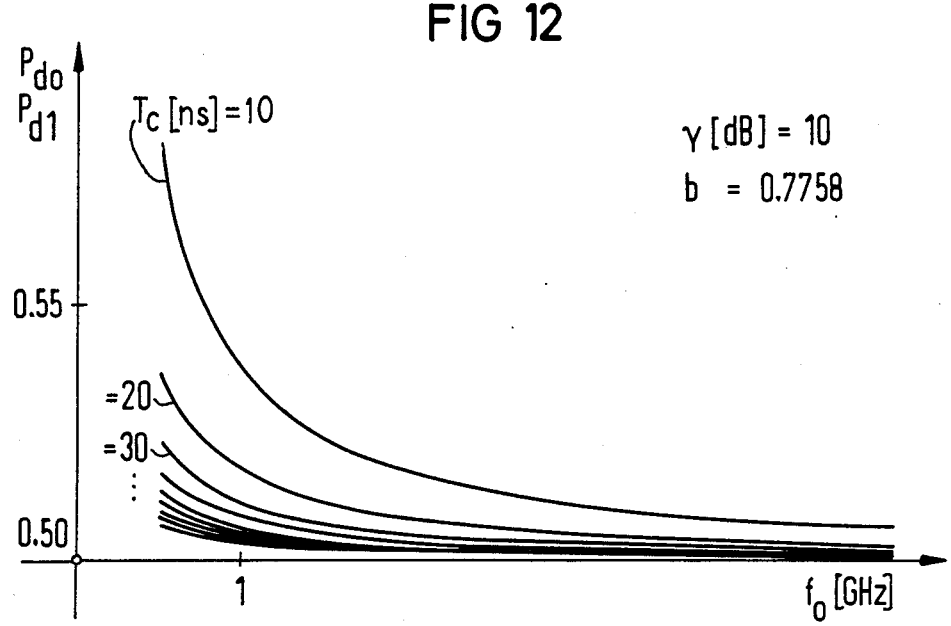
FIGS. 12 and 13 illustrate detection probabilities as a function of center transmission frequency, based on selected values of threshold settings in FIG. 7 for equalizing detection probabilities in the main maximum and in the first side maximum, the respective curves showing the probability vs. frequency relationship for respective indicated values of chip duration (binary clock interval).
Figure 13:
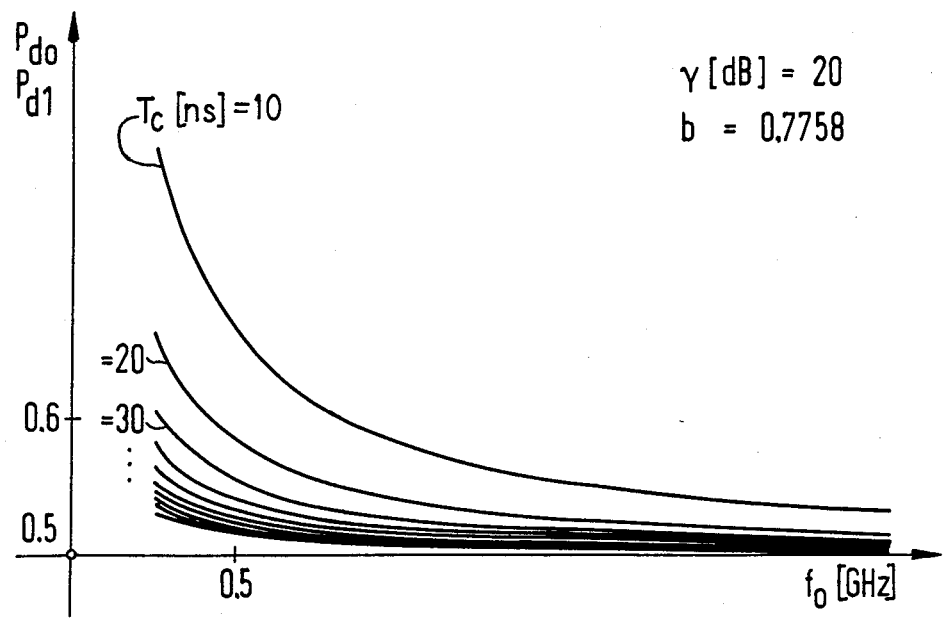

Since, however, the lowest detection probability $P_d$ according to expression (16) corresponds to the intersection of $P_{do}(\tau_b)$ and $P_{dl}(\tau_b)$, (n=1), this was investigated in greater detail in the sense of estimating the worst case. A few results of these investigations are compiled in FIGS. 12 and 13. The recognition probability $P_d$ according to expression (16) is respectively illustrated therein for $\tau_b = \tau_{bopt}$ as a function of the center transmission frequency $f_o$. The employed values of the parameters signal-to-noise ratio $\gamma$, height b of the decision threshold and chip duration $T_c$ are indicated in FIGS. 12 and 13.

The detection probabilities $P_d$ thus achieved by means of observing a single discrete event can be further increased in certain cases by means of post-integration.

The symbols employed in the foregoing explanation are listed in the following Table I for the sake of clarity:

TABLE I (Definitions of Symbols)

| | |
|---|---|
| a | Width of the directional radiator |
| A | Amplitude of the PN-PSK signal waveforms |
| b | Height of the detection threshold |
| e(t) | Reception signal |
| f | Frequency |
| $f_o$ | Center transmission frequency |
| $\underline{G}(f,\phi_e)$ | Transfer function of the transmission channel in the horizontal plane |
| $H_H$ | Hypothesis that there is reception in the main maximum |
| $H_N$ | Hypothesis that there is a reception in a side maximum |
| n | Order of the side maximum under consideration |
| n(t) | Noise signal |
| $p_T(\tau)$ | Probability density function for the level-crossing duration |
| $p_H(t)$ | Pseudo-random sequence allocated to the logical value H |
| $p_L(t)$ | Pseudo-random sequence allocated to the logical value L |
| $P_d$ | Recongition probability in the worst case estimate |
| $P_{do}$ | Recognition probability for reception in the major maximum |
| $P_{dn}$ | Recognition probability for reception in the minor maximum n |
| $Q_o, Q_n$ | Error probabilities |
| $s_H(t)$ | PN-PSK signal waveform |
| $s_L(t)$ | PN-PSK signal waveform |
| t | Time |
| $T_c$ | Chip duration (or binary clock interval) |
| $\gamma$ | Signal-to-noise ratio at the output of the signal-adapted filter in dB |
| $\phi, \phi_e$ | Horizontal angle |
| $\phi_L, \phi_H$ | Null-phase angle of the PN-PSK signal waveforms |
| $\lambda_0$ | Free-space wavelength at the center transmission frequency $f_o$ |
| $\sigma^2$ | Variance of the noise signal |
| $\tau$ | Level-crossing |
| $\tau_b$ | Height of the discrimination threshold |
| $\tau_{bopt}$ | Optimum height of the discrimination threshold in the worst case estimate |
| $\theta$ | Vertical angle |

BACKGROUND INFORMATION

The abbreviation "PN-PSK" literally stands for pseudo-noise phase-shift keying. By way of background, reference may be made to the following:

(1) Baier et al. U.S. Pat. No. 4,214,209 issued July 22, 1980, and entitled "Circuit For Synchronizing A Pseudo-Random Generator Mounted at a Receiver For Communication Transmission Systems Utilizing Pseudo-Noise Phase Shift Keying."

(2) Baier et al. U.S. Pat. No. 4,327,438 issued Apr. 27, 1982, and entitled ∓Receiving Circuit In An Interference-Suppressing Communications System Comprising Narrow-Band Conventional Message Modulation And Additional Pseudo-Noise Phase Shift Keying."

Baier et al. U.S. Pat. No. 4,327,438 shows a correlation circuit in the second figure thereof which may be utilized for components 9 and 10 in FIG. 1 hereof and for component 17 of FIGS. 2 and 7.

The abbreviation "erf" in equations (9), (11), (12) and (13) refers to the error function defined, for example, in Appendix 3 of the following text: *Communication Theory Principles* by Charles W. McMullen, The Macmillan Company, New York, 1968.

An example of a planar type directional antenna is found at page 43 of the aforementioned text *Sekundär-Radar*, (page 41 of the U.S. version *Secondary Radar*).

The term "rect (t/T)" in equations (1) and (2) of the Detailed Description represents the waveform as a function of time of the carrier envelope which may be essentially rectangular and have a time duration T, where T is equal to the product of the number L of "chips" or clock intervals of the generator 4 or 5, and the "chip duration" $T_C$.

SUPPLEMENTARY DISCUSSION

It will be apparent to those skilled in the art that threshold detection circuit 22 may supply a rectangular waveform output of constant amplitude and of duration corresponding to the time interval during which the input correlation pulse exceeds the threshold value b. The circuit 22 thus is a threshold comparator circuit which switches from a logical zero to a logical one output signal level when the threshold value b is exceeded and which switches back to the logical zero signal level when the input signal falls below threshold value b.

The $\tau$ measurement circuit 23 may be an integrator circuit which simply integrates the rectangular waveform signal from component 22 as a function of time and supplies an output signal which is an analog measure of the area under the rectangular waveform signal as a function of time and thus a measure of the duration $\tau$ of this input signal.

The threshold detector 24 may include a comparator circuit for switching from a logical zero signal level to a logical one signal level whenever the threshold value $\tau_b$ is exceeded.

In the discriminator circuit of FIG. 7, the output of the first threshold detector 22 may be supplied via a monostable trigger circuit of component 23 to an AND gate associated with output HM of component 24. Thus, so long as the output from envelope detector 21 is below the threshold value b, there will be a logical zero signal level from the first threshold detector 22, and the monostable trigger circuit of component 23 will supply a logical zero signal level to disable the AND gate of component 24. The output of the AND gate, representing output HM, will thus be at the logical zero level. If the output of envelope detector 21 exceeds the threshold value b for a time interval $\tau$, the monostable trigger circuit may be triggered to its active state, for example at the trailing edge of the threshold detector output, supplying a logical one readout pulse for momentarily enabling the AND gate of component 24. In this example the trigger circuit of component 23 may be triggered by a negative-going signal so as to be activated when the output of the first threshold value circuit 22 has its output switch from a logical one signal level to a logical zero signal level. The trigger circuit of component 23 will then pulse the AND gate at a time when the measurement of the time duration $\tau$ by component 23 has been completed.

If, for example, the time measurement circuit of component 23 is an analog integrating circuit for measuring the area under the output waveform from threshold discriminator 22, as a measure of $\tau$, the readout pulse from the trigger circuit of component 23, after a suitable delay, may reset the analog integration circuit of component 23.

For the specific example just given, component 23 may thus include a suitable monostable trigger circuit for responding to the negative-going trailing edge of the rectangular waveform supplied by the threshold comparator circuit of component 22. The connecting line between components 23 and 24 may then represent multiple conductors, so that the integration value representing a measure of $\tau$ and the trigger signal are both supplied to component 24. Thus FIG. 7 adequately illustrates the specific example just given.

For the case where transmitter 1 in FIG. 1 is utilized to transmit interrogation codes as explained in the text *Sekundär Radar* at section 1.2.1, page 22, (section 1.2.1 at pages 21-22 of the English version *Secondary Radar*), the binary message may comprise, for example, a series of three binary digits occupying a total time interval of about twenty-two microseconds, with successive series occurring at intervals of about 2.2 milliseconds. In such a case the output of each of the filters 9 and 10 in FIG. 1 may connect with an individual discriminator circuit such as described with reference to FIG. 7, or the correlation pulses from filters 9 and 10 may be combined by a suitable summing circuit to form a single pulse train with three successive pulses such as shown at 16 and/or 20, for each interrogation interval. The here described system has to operate with a larger bandswidth than today's systems.

Where a series of three correlation pulses is to be received in each interrogation interval, the value b may be dynamically set based on the peak value obtained from the first correlation pulse or from the first two correlation pulses of a series. For example a digital to analog converter circuit may receive a manually selected input b as a four digit decimal number (e.g. 0.7758) by means of a suitable manually controlled dial-up selector, a keyboard, or the like. A peak value circuit may be coupled to a sample and hold circuit such that the first and second correlation pulses of each series may be supplied to the peak value circuit for selection of the peak value thereof. The second correlation pulse of each series may trigger a sample and hold actuating circuit which is enabled by the first correlation pulse. The actuating circuit activates the sample and hold circuit and then resets the peak value circuit. The stored peak value in the sample and hold circuit then controls the reference signal level for the digital to analog converter during receipt of the third correlation pulse of each series. A time delay and reset circuit may then insure that the entire discriminator circuit is reset after a suitable time interval following receipt of the third pulse. A threshold value circuit connected with the peak value circuit may disable the discriminator circuit if at least one of the first two correlation pulses does not exceed a minimum threshold value, which may correspond to a minimum useful setting for b, FIG. 7, for the embodiment described in the Detailed Description.

It will be apparent to those skilled in the art that component 23 may include in integrator that sums values of duration $\tau$ for three successive correlation pulses, for example, and that threshold detector 24 may have a corresponding threshold setting of three times $\tau_b$. In this case a counting circuit would count successive correlation pulses and transmit only the third trigger pulse of a series to the AND gate of component 24 as the readout pulse for activating the alarm readout function. The counting circuit would then control the delayed reset of the integration circuit of component 23 so that the integration circuit would only be reset after readout of the τ interval based on three successive correlation pulses.

In FIG. 7, the receiving transducer 8 may represent a component of an acoustic transmission system based for example on radiation of acoustic energy in a gaseous or liquid medium. Alternatively transducer 8 may respond to radiant electromagnetic energy of frequency above the radio frequency range.

It will be apparent that many modifications and variations may be made without departing from the scope of the teachings and concepts of the present invention.

We claim as our invention:

1. A spread-spectrum-system comprising a transmitter means having a transmitting transducer for emitting spread-spectrum signals, and receiver means having a receiving transducer operable for receiving the spread-spectrum signals from the transmitting transducer when aligned with said transmitting transducer in an alignment direction corresponding to any of a plurality of alignment orientations wherein spread-spectrum signal energy is transmitted between said transducers, at least one of said transducers providing a directional radiation characteristic such that a transmitted spread-spectrum-signal from the transmitting transducer when received by the receiving transducer produces a direction-dependent received spread spectrum signal in said receiver means having a signal property in addition to amplitude and power which signal property has respective different characteristics in dependence upon which of the respective direction orientations corresponds to the relative directions between said transducers, said receiver means having a relative direction sensing discriminator circuit coupled with the receiving transducer for processing the direction dependent received spread-spectrum signals and supplying an output which is a measure of the orientation between said transducers.

2. The system of claim 1, wherein said receiver means includes comparison means which compares said direction-dependent received spread-spectrum signals with a representation of the transmitted spread-spectrum signals and supplies a comparison signal which is a function of the deviation of the received spread-spectrum signals from the transmitted spread-spectrum signals.

3. The system of claim 1, wherein said transmitter means and said receiver means have transducers in the form of antennas for the transmission and reception of radio frequency signals by means of radio wave propagation.

4. The system of claim 1, wherein said transmitter means and said receiver means have acoustic transducers for the transmission and reception of acoustic signals.

5. The system of claim 1, wherein said transmitter means and said receiver means have optical transducers for the transmission and reception of optical signals.

6. The system of claim 1, wherein said transmitter means and said receiver means send and receive message information via said broadband signal.

7. The system of claim 6, wherein said transmitter means and said receiver means function as a spread spectrum transmission system wherein the message information corresponds to a relatively narrow range of baseband frequencies, but is transmitted via a carrier wave which is subjected to band spreading modulation beyond that required to transmit the baseband frequencies.

8. The system of claim 7, wherein said message information is transmitted via a carrier wave which is subjected to constant envelope spreading modulation, to pseudo-random phase-shift modulation.

9. The system of claim 1, wherein said discriminator circuit identifies and evaluates the duration of the transgression of a selected threshold (=level-crossing duration) as a measure of alignment orientation.

10. The transmission system of claim 1, wherein the receiver supplies a series of pulses to the direction sensing discriminator circuit which have waveforms as a function of time in dependence upon whether the direction direction between the transducers corresponds with a main lobe transmission direction or a side lobe transmission direction, and said direction sensing discriminator circuit supplying measurement pulses which are a function of such direction direction.

11. The transmission system of claim 10, wherein said direction sensing discriminator circuit includes integration means for integrating said measurement pulses to obtain direction sensing signal which is a function of the relative direction.

12. The transmission system of claim 10, wherein said direction sensing discriminator circuit includes integration means operating over a time interval corresponding to plural ones of said series of pulses for reducing error probabilities in the sensing of alignment direction.

13. The transmission system of claim 1 wherein said discriminator means includes manually controlled digital input means for manual input of a selected digital value for controlling said discriminator means to discriminate between a main lobe direction and a side lobe the relative direction.

14. The method of detecting alignment direction between transmitting and receiving transducers having a directional radiant energy coupling pattern as a function of relative direction therebetween such that the transfer function for the signal transmission path between the transducers is a non-linear function transducer relative direction, said method comprising:

(a) radiating a spread-spectrum signal by means of the transmitting transducer, (b) receiving the radiated spread-spectrum signal by means of said receiving transducer after transmission thereof along the signal transmission path, and generating a measurement signal which is sensitive to relative direction, and (c) evaluating the measurement signal on the basis of a property resulting from said non-linear transfer function, which property is essentially independent of the length of said transmission path, as a measure of the relative direction between said transducers.

15. The method of claim 14, wherein the evaluating step is carried out on the basis of a measurement signal which is a function of a comparison of the received spread-spectrum signal with a representation of the radiated spread-spectrum signal.

16. The method of claim 14, wherein the evaluating step is carried out on the basis of the wave shape of the measurement signal.

17. The method of claim 14, wherein the radiated signal includes message modulation, and is subjected to band-spreading modulation beyond that required to transmit the message.

18. The method of claim 14, wherein the radiated signal is subjected to constant envelope spreading modulation, e.g. to a psuedo-random phase-shift modulation for noise or jamming suppression.

19. The method of claim 14, wherein the evaluating step comprises evaluating the time duration of a selected peak portion of the measurement signal.

20. The method of claim 19, wherein the radiated spread-spectrum signal contains message information and additional band-spreading modulation, the measurement signal generating step being based on a correlation of the received spread-spectrum signal with a representation of the band-spreading modulation, and the evaluating step sensing deviation of the peak portion of the measurement signal resulting from such correlation, from the correlation signal produced when the transducers are aligned in a direction which provides maximum radiant energy coupling therebetween.

21. A spread-spectrum-system comprising a transmitter having a binary message source, a driving selection circuit receiving the output of said binary message source, a pair of signal generators connected to the output of the drive selection circuit and producing respectively spread-spectrum-signals of the form $$s_L(t) = A \text{ rect } (t/T) p(t) \cos (2\pi f_o t + \phi_L) \quad (1)$$

and $$s_H(t) = A \text{ rect } (t/T) p_H(t) \cos (2\pi f_o t + \phi_H) \quad (2)$$

where A is the amplitude of PN-PSK signal waveforms rect (t/T) representing the waveform as a function of the time of the carrier envelope which may be essentially rectangular and for a time duration T where T is equal to the product of the number L of "chips" or closk intervals respectively of said first and second generators, $p_L(t)$ is the pseudo-random sequence allocated to the logical value L and $p_H(t)$ is the pseudo-random sequence allocated to the logical value H, a directional antenna connected to the outputs of said first and second generators, a receiver located at a remote location, from said transmitter and having a receiving transducer, first and second filter correlation circuits connected to the output of said receiving transducer and said first filter correlation circuits matched to pass as output of received signal segments produced by the transmitted waveform $s_L(t)$ and said second filter correlation circuit matched to pass signal segments produced by the transmitted waveform $s_H(t)$, an envelope detector receiving the outputs of said first and second filter correlation circuits, a synchronizing means supplying synchronizing signals to said envelope detector, a first threshold circuit connected to the output of the said envelope detector, a threshold transgression duration measurement circuit connected to the output of said first threshold circuit and a second threshold circuit receiving the output of said threshold transgression duration measurement circuit and producing signal outputs.

* * * * *